United States Patent [19]

Riley

[11] Patent Number: 4,945,796

[45] Date of Patent: Aug. 7, 1990

[54] METHOD OF PUNCHING MATERIAL

[76] Inventor: Wayne F. Riley, 38401 N. Pointe Dr., Apt. 115-T, Mount Clemens, Mich. 48045

[21] Appl. No.: 316,240

[22] Filed: Feb. 27, 1989

[51] Int. Cl.$^5$ ............................................. B23D 27/00
[52] U.S. Cl. ............................................ 83/49; 83/39
[58] Field of Search ..................... 83/49, 527, 39, 529, 83/525, 555, 561, 636, 639, 638; 72/325

[56] References Cited

U.S. PATENT DOCUMENTS

| | | | |
|---|---|---|---|
| 3,232,156 | 2/1966 | Fuller | 83/39 |
| 3,473,362 | 10/1969 | Black et al. | 72/325 |
| 3,485,131 | 12/1969 | Brolund | 83/560 |
| 3,791,289 | 2/1974 | Lamorte et al. | |
| 3,799,051 | 3/1974 | Liberman | |
| 3,802,335 | 4/1974 | Longo | |
| 3,818,195 | 6/1974 | Levine | |
| 3,827,347 | 8/1974 | Gilman | |
| 4,070,936 | 1/1978 | Duncan | |
| 4,115,859 | 9/1978 | Brisk et al. | |
| 4,241,652 | 12/1980 | Smedlund | |
| 4,378,717 | 4/1983 | Schneider et al. | |
| 4,429,627 | 2/1984 | Edsö | |
| 4,473,215 | 9/1984 | Rathfon, II et al. | |
| 4,481,847 | 11/1984 | Schneider et al. | |
| 4,486,841 | 12/1984 | Koyama et al. | |
| 4,633,720 | 1/1987 | Dybel et al. | |
| 4,651,273 | 3/1987 | Braitinger et al. | |
| 4,653,300 | 3/1987 | Crout et al. | |
| 4,704,689 | 11/1987 | Asakura | |
| 4,771,663 | 9/1988 | Naito et al. | 83/49 |
| 4,784,058 | 11/1988 | Nakagawa et al. | |

Primary Examiner—Frank T. Yost
Assistant Examiner—Hwei-Siu Payer
Attorney, Agent, or Firm—Harness, Dickey & Pierce

[57] ABSTRACT

The present invention is a method for removing material from a sheet of material with a press having a movable upper platen, a stationary lower platen, and a cutting tool secured to the upper platen. The method includes the steps of establishing a reference point at the surface of the material with the cutting tool and moving the upper platen and cutting tool away from the lower platen a predetermined distance once the reference point is established. The steps also include moving the upper platen and cutting tool toward the lower platen the predetermined distance plus a percentage of the thickness of the material to displace material to be cut with the cutting tool. The steps further include repeating the latter two steps a plurality of times until the material to be cut is removed from the remainder of the material.

6 Claims, 6 Drawing Sheets

METHOD OF PUNCHING MATERIAL

BACKGROUND OF THE INVENTION

1. Field of the Invention

The present invention relates generally to presses, and more particularly to, a method for intermittently punching material with a press.

2. Description of Related Art

Currently, presses are being used to remove or punch material when forming a part from a sheet of material. Typically, the press has a frame, an upper platen with a cutting or punching tool, a lower platen and means for moving the upper platen toward the lower platen. The frame for these presses is rather large in size and height to allow the upper platen to develop enough inertia for the cutting tool such that the cutting tool can stamp or punch the material in a single continuous stroke.

To cut or punch material in a single continuous stroke, the cutting force commonly needed is equal to the yield strength of the material times the length of the cut or punch. Typically, over thirty percent (30%) of the material thickness has to be exceeded in order to allow the material being cut or punched to separate from the remainder of the material. As a result, the frame of the press must be sufficient in size to provide the structural force needed to absorb the cutting pressure. This structural force commonly is equal to the mass of the cutting tool or punch times the inertia thereof.

One problem with conventional presses is that the frame of the press must be rather large in size and height to absorb the required cutting pressure. As a result, a corresponding room must be of large dimensions to contain the press. Another problem is that these presses commonly have a "pit" or cavity disposed below in the support surface to aid in containing the press. This requires the press to be placed in a predetermined position on the support surface. This limits the mobility of the press. A further problem is that heavy equipment is required to move the press. This also reduces the mobility of the press. A still further problem is that a large size and height of the press is required to develop the inertia necessary for punching or removing material in one continuous stroke.

It is, therefore, one object of the present invention to provide a method of removing or punching material that requires a press smaller in size and height than conventional presses.

It is another object of the present invention to reduce the inertia required for the punch or cutting tool.

It is a further object of the present invention to reduce the structural force required for the press when cutting or punching material.

This application is related to another application entitled "APPARATUS FOR PUNCHING MATERIAL" filed on the same date and having similar Specification and drawings.

SUMMARY OF THE INVENTION

Accordingly, the present invention is a method for removing material from a sheet of material with a press having a movable upper platen, a stationary lower platen, and a cutting tool secured to the upper platen. The method includes the steps of establishing a reference point at the surface of the material with the cutting tool and moving the upper platen and cutting tool away from the lower platen a predetermined distance once the reference point is established. The steps also include moving the upper platen and cutting tool toward the lower platen the predetermined distance plus a percentage of the thickness of the material to displace material to be cut with the cutting tool. The steps further include repeating the latter two steps a plurality of times until the material to be cut is removed from the remainder of the material.

One advantage of the present invention is that the inertia required for punching or cutting is reduced by pulsating or intermittently moving the punch or cutting tool into the material. Correspondingly, the structural force needed to absorb the cutting pressure is reduced. This provides the advantage of a press that is smaller in size and height than conventional presses. Another advantage of the present invention is that the press is mobile and may be moved with light equipment such as a fork-lift or the like.

Other advantages of the present invention will be readily appreciated as the same becomes better understood by reference to the following detailed description when considered in connection with the accompanying drawings.

DESCRIPTION OF THE PREFERRED EMBODIMENT

Figure 1:
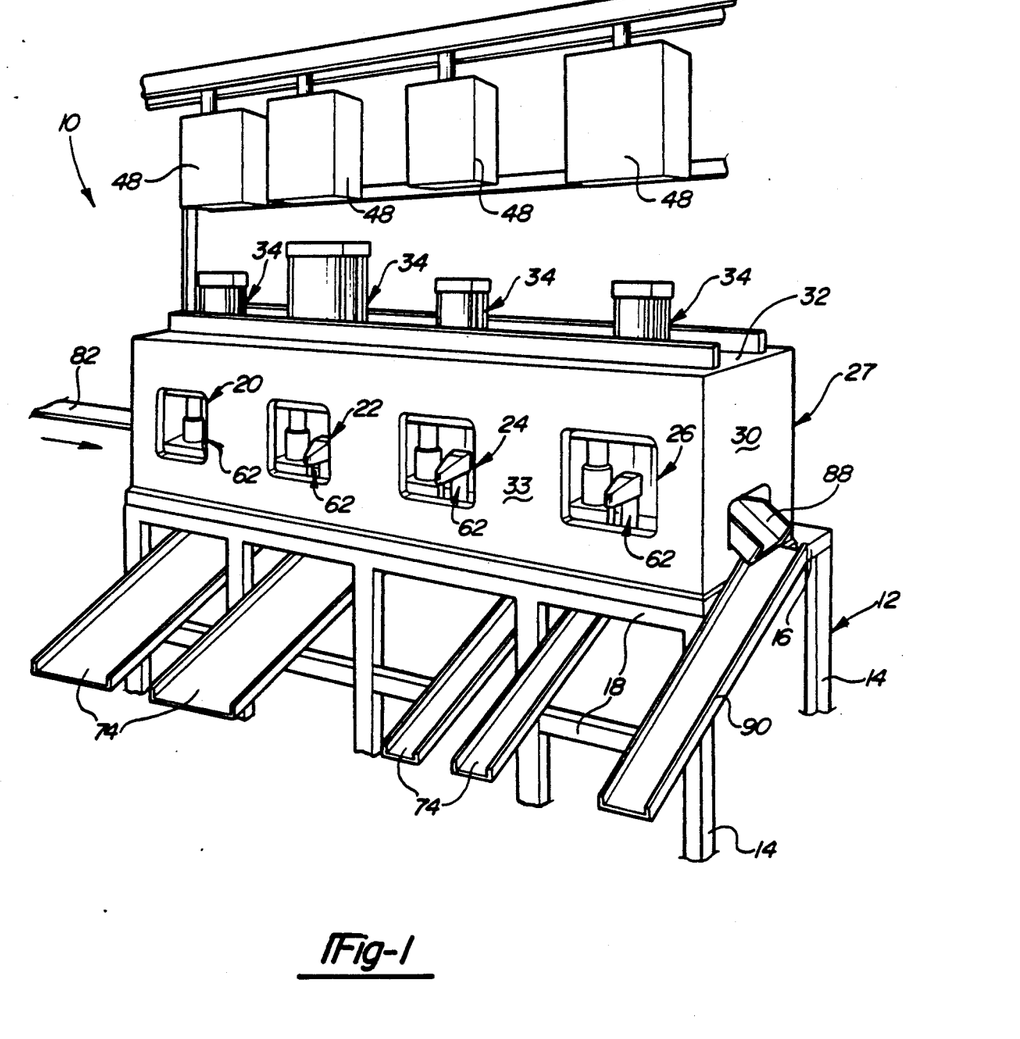
FIG. 1 is a perspective view of an apparatus constructed in accordance with the principles of the present invention.
Figure 2:
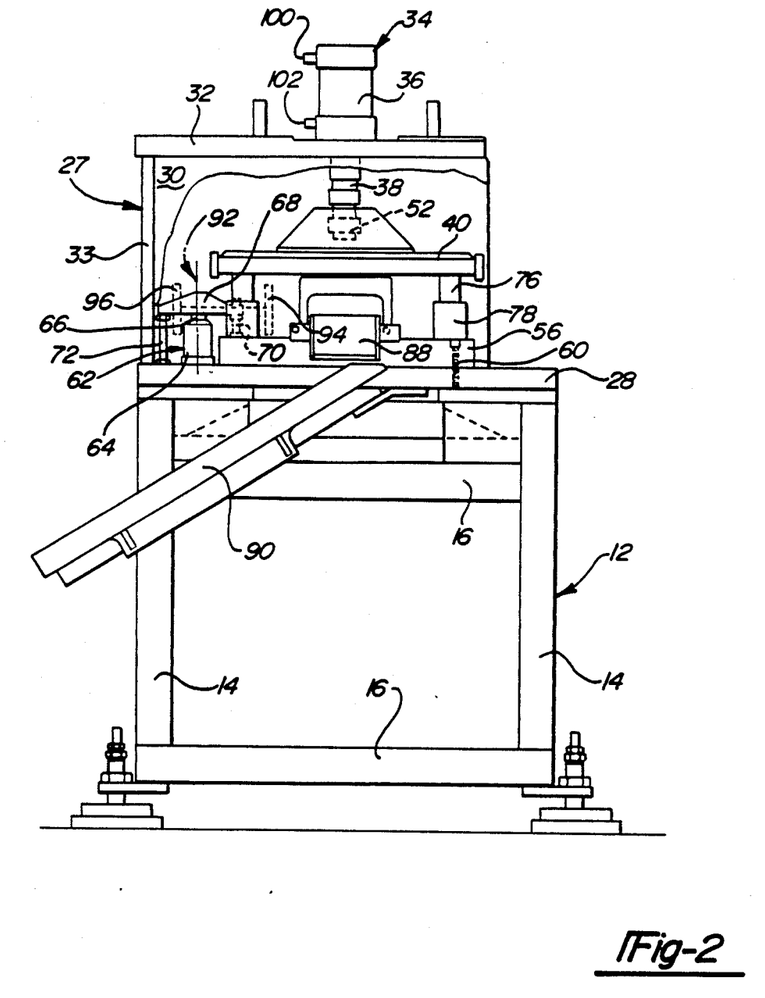
FIG. 2 is a side elevational view of the apparatus of FIG. 1.
Figure 3:
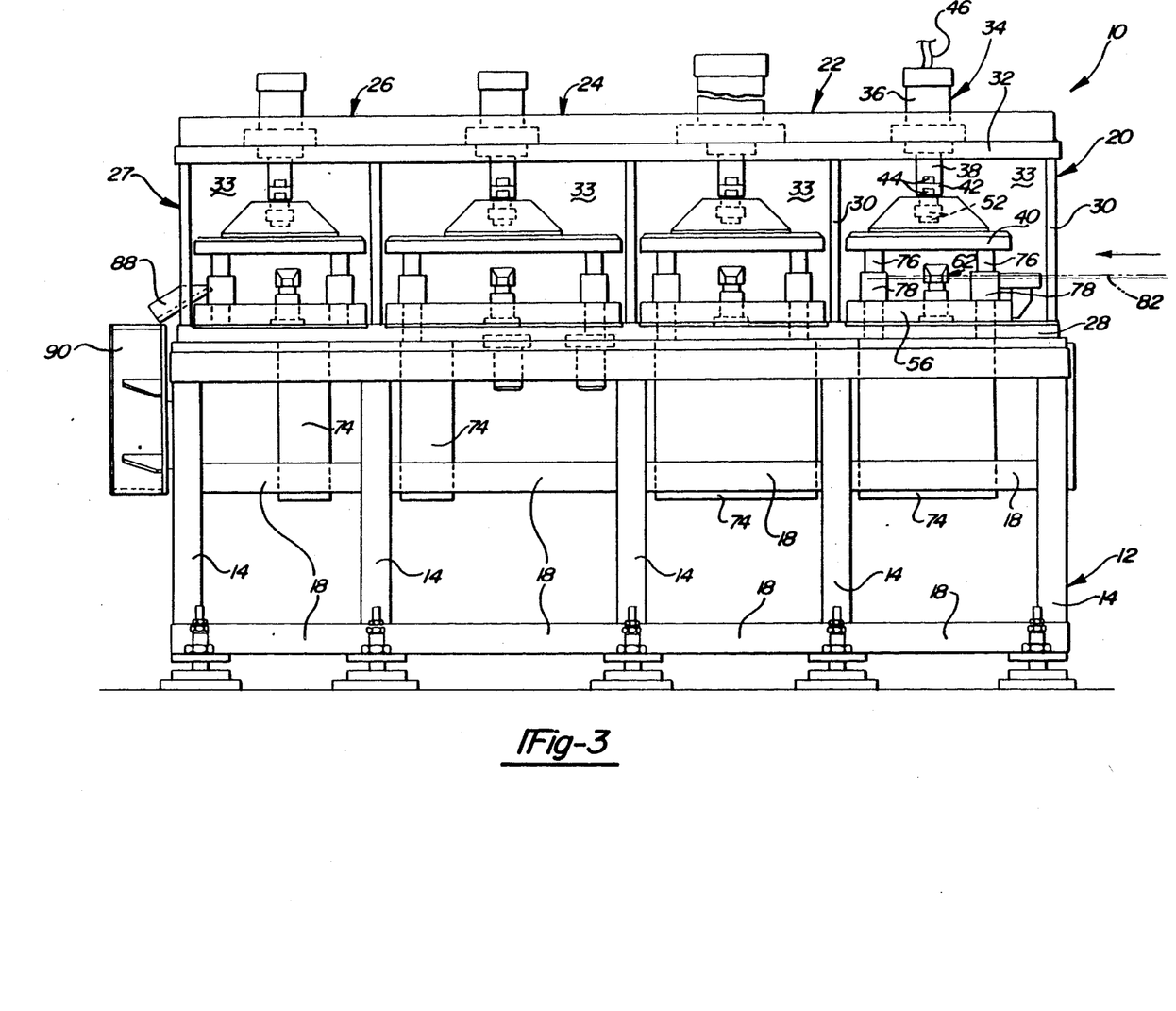
FIG. 3 is a front elevational view of the apparatus of FIG. 1.

Referring to FIGS. 1 through 3, a progressive die, press system or apparatus 10 is shown. The apparatus 10 includes a lower frame or stand, generally indicated at 12, which is adapted to rest upon a support surface. The lower frame 12 comprises a plurality of vertically extending leg members 14 interconnected by laterally and longitudinally extending support members 16 and 18. The lower frame 12 is generally rectangular in shape and the leg members 14 and support members 16 and 18 may be adjoined at their ends by welding or the like. The lower frame 12 supports at least one, preferably four individual presses, generally indicated at 20, 22, 24 and 26 respectively in series and in spaced relation to the support surface. Since each individual press is similar to each other, only the press 20 will be described.

The press 20 includes a stationary lower platen 28 which is secured to the lower frame 12 by welding or the like. The press 20 also includes a generally rectangular upper frame or housing, generally indicated at 27, comprising a pair of transversely spaced and upwardly extending side support members 30 connected or secured to the lower platen 28 by welding or the like. The upper frame 27 also comprises an upper support member 32 extending generally horizontally between the side support members 30 and connected by welding or the like to the upper end of the side support members 30. The upper frame 27 further comrpises a vertically extending back plate 33 secured by welding or the like to the side and upper support members 30 and 32. The side and upper support members 30 and 32, respectively, and back plate 33 may be connected to one another by suitable means other than welding.

The press 20 also includes a fluid-actuating device, generally indicated at 34, secured to the upper support member 32. The fluid actuating device 34 comprises a fluid cylinder 36 having a movable piston 37 (FIG. 5) disposed therein. The fluid cylinder 36 is secured to the upper support member 32 by any suitable means such as brackets and fasteners, welding or the like. The fluid-actuating device 34 also includes a piston rod 38 having one end connected to the piston 37 and the other end extending outwardly from one end of the fluid cylinder 36 toward the lower platen 28.

Figure 4:
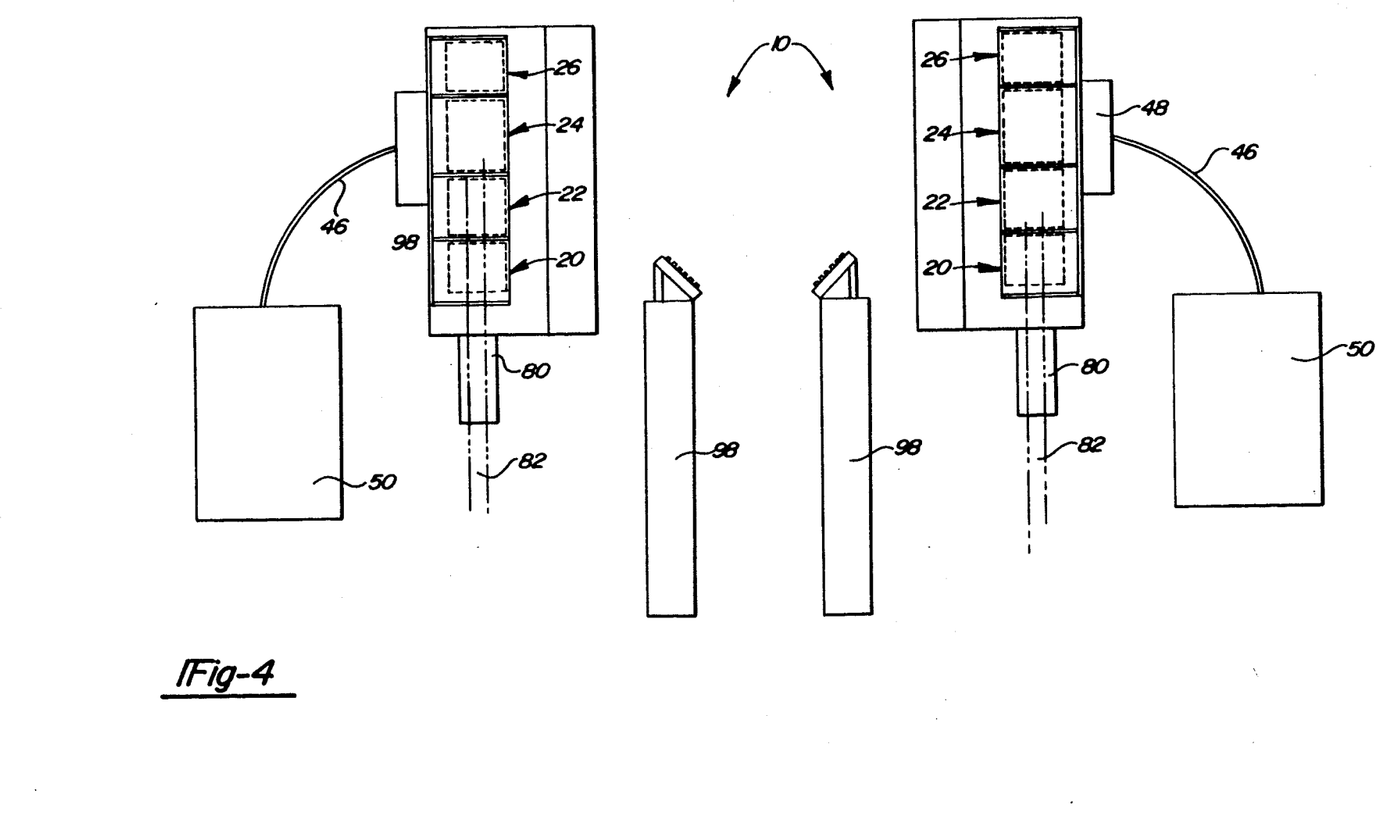
FIG. 4 is a plan schematic view of the apparatus of FIG. 1.
Figure 5:
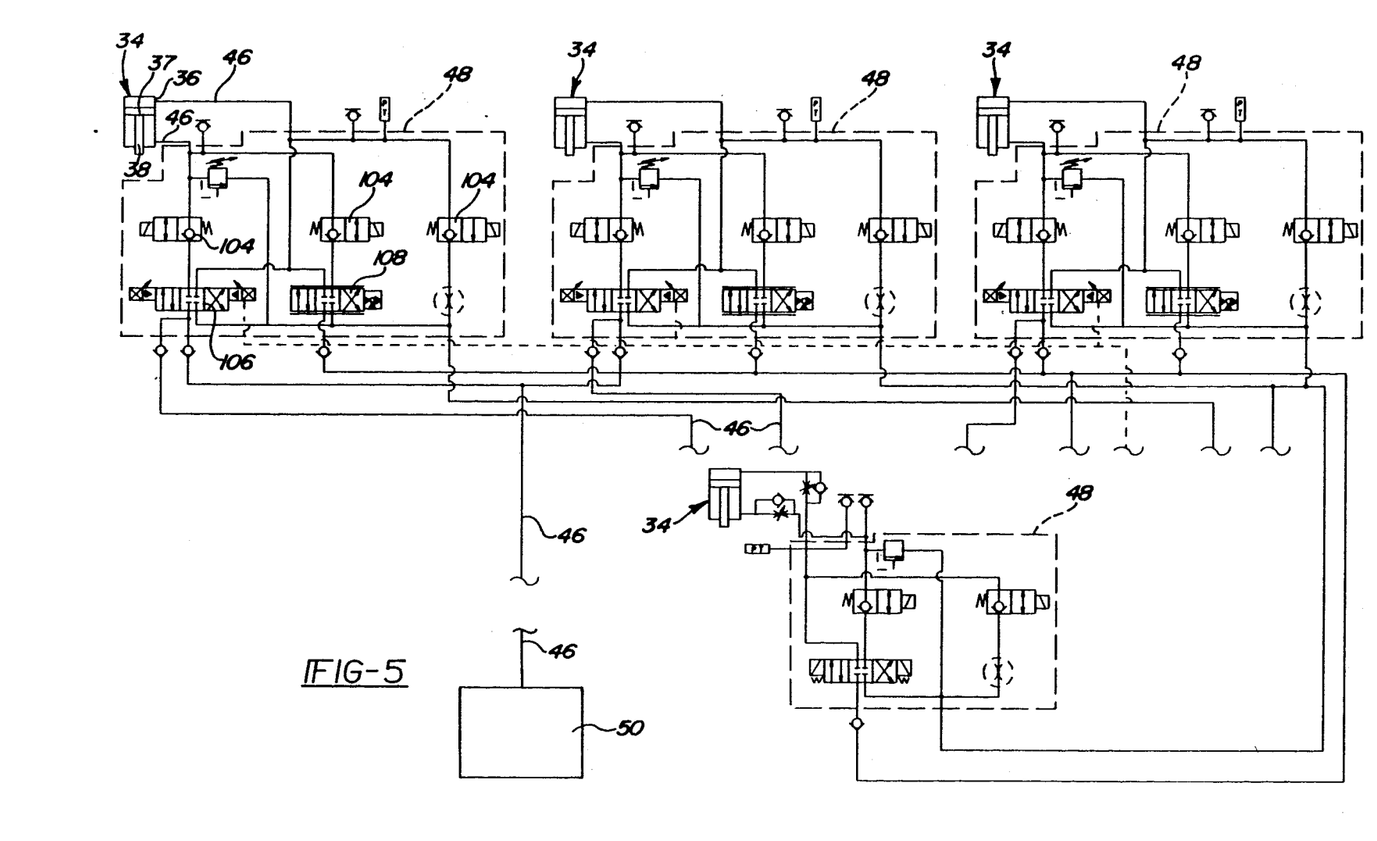
FIG. 5 is a schematic of the hydraulics for the apparatus of FIG. 1.

The press 20 further includes a movable upper platen 40 secured by brackets 42 and fasteners 44 to the free end of the piston rod 38. It should be appreciated that any suitable means may be used to secure the upper platen 40 to the piston rod 38. The fluid-actuating device 34 is pressurized to support the upper platen 40 in spaced relation to the lower platen 28. As illustrated in FIGS. 4 and 5, the fluid cylinder 36 is connected in a conventional manner by fluid lines 46 to a fluid regulating device or manifold 48 which, in turn, is connected by fluid lines 46 to a source of fluid pressure 50 such as a hydraulic pump and fluid reservoir or the like to move the piston 37 to extend and retract the piston rod 38, thereby moving the upper platen 40 toward and away from the lower platen 28.

The press 20 also includes a punch or cutting tool 52 disposed within and secured to the upper platen 40. The cutting tool 52 is used to cut, punch or remove material from a sheet 82 which is fed into the press 20. It should be appreciated that any suitable means may be used to secure the cutting tool 52 to the upper platen 40.

The press 20 also includes a work plate or tool 56 which rests upon the lower platen 28. The work tool 56 is a generally rectangular plate having a cavity 58 (FIG. 6) formed therein. The work tool 56 is secured to the lower platen 28 by at least one fastener 60 in the front and by a fluid actuated clamp 62 in the back. The fluid actuated clamp 62 includes a fluid cylinder 64 secured by suitable means to the lower platen 28. The fluid cylinder 64 has a movable piston (not shown) disposed therein and connected to one end of a piston rod 66. The piston rod 66 has a horizontally extending T-shaped member 68 connected to the other end of the piston rod 66. The T-shaped member 68 has a first adjustable fastener 70 at one end for engaging and disengaging the work tool 56 and a second adjustable fastener 72 at the other end for engaging and disengaging the lower platen 28. The fluid cylinder 64 is connected by fluid lines 46 to the source of fluid pressure 50 to move the piston, thereby extending and retracting the piston rod 66 to engage and disengage the work tool 56. It should be appreciated that any suitable means could be used to secure the work tool 56 to the lower platen 28.

As illustrated in FIGS. 1 through 3, each press has a chute 74 or the like disposed below the cavity 58 of the work tool 56 to allow removed material to escape the press 20. It should be appreciated that any suitable means could be used to secure the chute 74 to the lower frame 12.

The press 20 also includes a pair of transversely spaced guide rods 76 which are sliding disposed in a corresponding pair of guide bushings 78 extending upwardly from the work tool 56. The guide bars 76 and bushings 78 maintain parallel alignment between the upper platen 40 and the work tool 56 as the upper platen 40 moves in relation to the lower platen 28.

The apparatus 10 also includes a feeding mechanism 80 for feeding a continuous sheet of material 82 through the presses 20, 22, 24 and 26. As the sheet of material 82 moves or feeds through the presses 20 22, 24 and 26, each press removes material from the sheet of material 82. The sheet of material 82 moves as a continuous sheet until the last press 26 removes the part from the remainder of the sheet of material 82. The part produced escapes on chutes 88 and 90 secured to the lower frame 12. It should be appreciated to one skilled in the art that the apparatus 10 is similar to a progressive die.

Referring to FIG. 2, a mechanical stop such as a cam rotator 92 limits the relative distance that the upper platen 40 may move toward the work tool 56. The cam rotators 92 include stops 94 and 96 having a different height relative to each other to stop the upper platen 40 in its movement toward the work tool 56. In other words, the stop 94 may limit the penetration of the cutting tool 52 into the material 82 at a predetermined depth such as ten percent (10%) of the thickness of the material 82 while the stop 96 would allow the cutting tool to penetrate a second predetermined depth such as twenty percent (20%) of the thickness of the material 82. The cam rotator 92 rotates the stops 94 and 96 in and out of the space between the upper platen 40 and work tool 56 each time the piston rod 38 and upper platen 40 are retracted. It should be appreciated that any suitable means may be used to limit or control the position of the cutting tool 52 and upper platen 40 relative to the work tool 56 and lower platen 28.

Referring to FIGS. 2 and 4, the position of the upper platen 40 and cutting tool 52 may be controlled electronically by an electronic control unit 98 or the like as a substitute for the cam rotators 92. The electronic control unit 98 is electrically connected to the fluid regulating device 48 and a pair of position sensors 100 and 102 on the fluid cylinder 36. The position sensors 100 and 102 monitor the position of the piston 37 within the fluid cylinders 36 to control the relative position of the piston 37 within the fluid cylinder 36. In other words, the controlled movement of the piston 37 results in a controlled or finite movement of the cutting tool 52 and upper platen 40 toward the sheet of material 82 and work tool 56. It should be appreciated that any suitable electronic control unit 98 may be used to control the operation of the system 10 according to the method to be described.

Referring to FIG. 5, a hydraulic schematic for the apparatus 10 is shown. The fluid cylinder 36 is connected by fluid lines 46 to the fluid regulating device 48.

The fluid regulating devices 48 comprises a plurality of, preferably three, servo-control valves 104 to change or control the directional movement of the piston 37. In other words, the servo-control valves 104 drive the piston 37 one way or the other to provide finite control of the fluid actuating device 34. The fluid regulating device 48 also includes a proportional valve 106 and associated stack 108 which are connected to the servo-control valves 104 to allow fluid flow in and out of the fluid actuating device 34. The proportional valve 106 and stack 108 control the fluid flow and pressure requirements for the fluid actuating device 34. The proportional valve 106 and stack 108 are connected by fluid lines 46 to the pressure source or hydraulic pump 50. It should be appreciated that the servo-control valves 104, porportional valve 106 and stack 108 are conventional.

Figure 6:
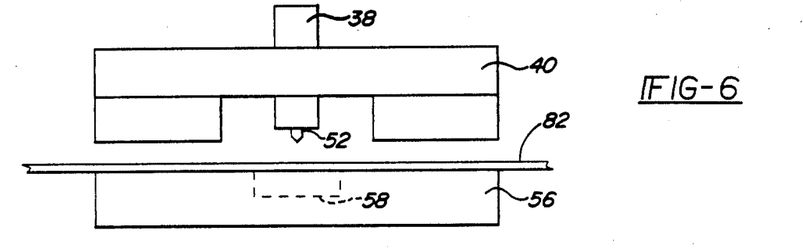
FIG. 6 is an enlarged schematic view of a portion of the apparatus for removing material according to the present method.
Figure 7:
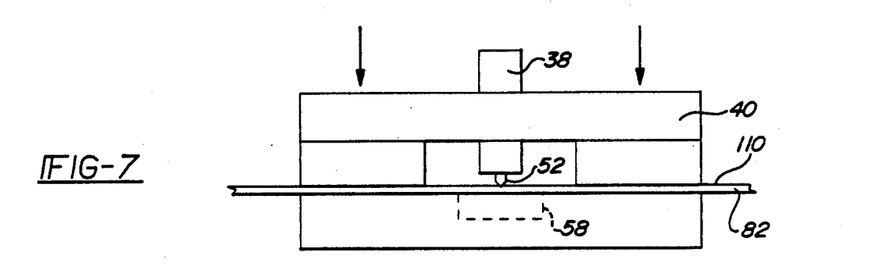
FIG. 7 is a view similar to FIG. 6 with the cutting tool establishing a reference point with respect to the surface of the material.
Figures 8, 9, 10:
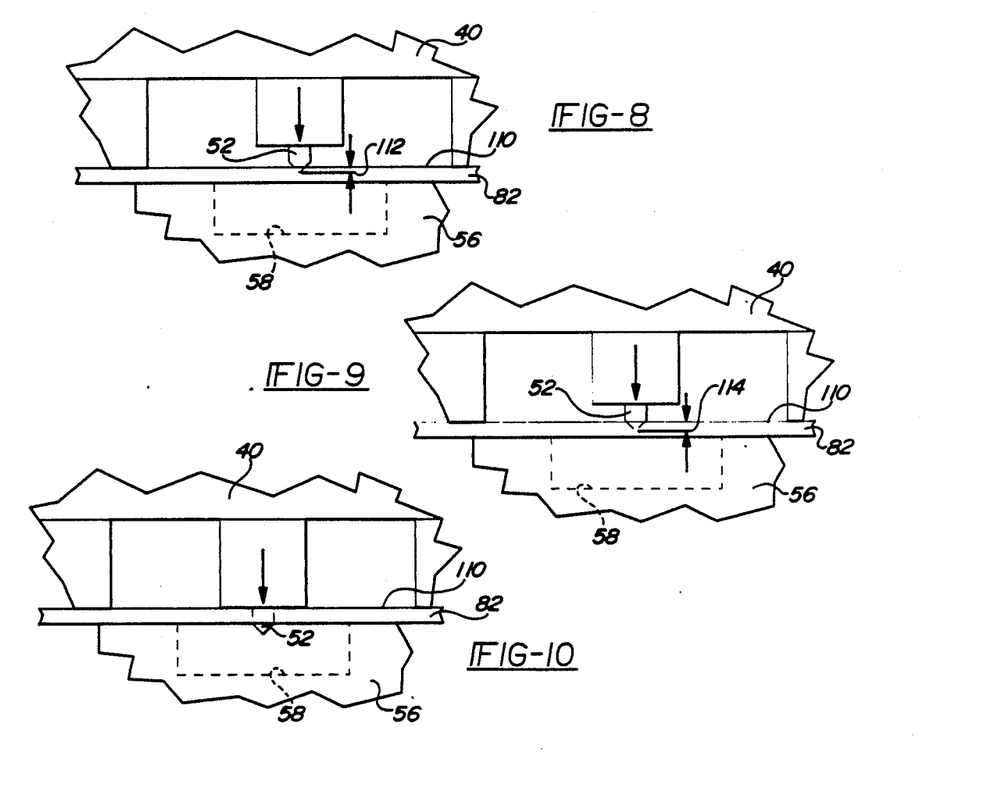
FIG. 8 is a view similar to FIG. 7 with the cutting tool penetrating the material in a first stage for the present method.
FIG. 9 is a view similar to FIG. 8 with the cutting tool penetrating the material in a second stage for the present method.
FIG. 10 is a view similar to FIG. 9 with the cutting tool breaking through the material in a third stage for the present method.

Referring to FIGS. 6 through 10, a schematic of the method according to the present invention is shown. As illustrated in FIG. 6, the upper platen 40 is moved toward the work tool 56 of the lower platen 28. As illustrated in FIG. 7, the cutting tool 52 touches the surface 110 of the material 82 to establish a zero reference or set point. The piston rod 38 is retracted a predetermined distance and then extended back to the surface 110 plus a predetermined percentage such as ten percent (10%) of the thickness of the material 82 to a point 112 as illustrated in FIG. 8. When this occurs, the material 82 is physically impregnated by the cutting tool 52 which displaces the material 82 but does not exceed the yield strength of the material 82. The piston rod 38 is then retracted and then extended back to the surface 110 plus a second predetermined percentage such as twenty percent (20%) of the original material thickness to point 114 as illustrated in FIG. 9. This also results in displacement of material 82 but does not exceed the yield strength of the material 82. Referring to FIG. 10, the piston rod 38 is retracted a distance and then extended to the surface 110 plus a third predetermined percentage such as thirty percent (30%) of the original material thickness to exceed the yield strength and break or snap through the material 82 such that material is removed from the remaining sheet of material 82. It should be appreciated by one skilled in the art that by pulsating or intermittently moving the cutting tool 52 as described above, less material remains after each displacement resulting in less inertia to break through in the third stage. It should further be appreciated that the entire method occurs in a short or small time period.

The present invention has been described in an illustrative manner. It is to be understood that the terminology which has been used is intended to be in the nature of words of decription rather than of limitation.

Obviously, many modifications or variations of the present invention are possible in light of the above teachings. Therefore, within the scope of the appended claims, the present invention may be practiced otherwise than as specifically described.

What is claimed is:

1. A method for removing material from a sheet of material with a press having a movable upper platen, a stationary lower platen, and a cutting tool secured to the upper platen, the method comprising the steps of:
   establishing a first reference point at the surface of the material with the cutting tool;
   moving the upper platen and cutting tool away from the lower platen a predetermined distance to a second reference point once the first reference point is established;
   moving the upper platen and cutting tool toward the lower platen the predetermined distance plus a first predetermined percentage of the thickness of the material to displace material to be cut with the cutting tool;
   moving the upper platen and cutting tool away from the lower platen to the second reference point;
   moving the upper platen and cutting tool toward the lower platen the predetermined distance plus a second predetermined percentage of the thickness of the material to displace material to be cut with the cutting tool;
   moving the upper platen and cutting tool away from the lower platen to the second reference point; and
   moving the upper platen and cutting tool toward the lower platen the predetermined distance plus a third predetermined percentage of the thickness of the material to exceed the yield strength of the material to be cut with the cutting tool and removing the material being cut away from the remainder of the material.

2. A method as set forth in claim 1 wherein the step of moving the upper platen and cutting tool toward the lower platen is equal to the predetermined distance plus ten percent of the thickness of the material for a first time of cutting.

3. A method as set forth in claim 1 wherein the step of moving the upper platen and cutting tool toward the lower platen is equal to the predetermined distance plus twenty percent of the thickness of the material for a second time of cutting.

4. A method as set forth in claim 1 wherein the step of moving the upper platen and cutting tool toward the lower platen is equal to the predetermined distance plus thirty percent of the thickness of the material for a third time of cutting to remove the material being cut from the remainder of material.

5. A method for removing material from a sheet of material with a press having a movable upper platen, a stationary lower platen, and a cutting tool secured to the upper platen, the method comprising the steps of:
   establishing a first reference point at the surface of the material with the cutting tool;
   moving the upper platen and cutting tool away from the lower platen a predetermined distance to a second reference point once the first reference point is established;
   moving the upper platen and cutting tool toward the lower platen the predetermined distance plus ten percent of the thickness of the material to dispalce material to be cut for a first time of cutting with the cutting tool;
   moving the upper platen and cutting tool away from the lower platen to the second reference point;
   moving the upper platen and cutting tool toward the lower platen the predetermined distance plus twenty percent of the thickness of the material for a second time of cutting;
   moving the upper platen and cutting tool away from the lower platen to the second reference point; and
   moving the upper platen and cutting tool toward the lower platen the predetermined distance plus thirty percent of the thickness of the material for a third time of cutting to exceed the yield strength of the material and removing the material being cut away from the remainder of the material.

6. A method for removing material from a sheet of material with a press having a movable upper platen, a stationary lower platen, and a cutting tool secured to the upper platen, the method comprising the steps of:
- establishing a first reference point at the surface of the material with the cutting tool;
- moving the upper platen and cutting tool away from the lower platen a predetermined distance to a second reference point once the first reference point is established;
- moving the upper platen and cutting tool toward the lower platen the predetermined distance plus a percentage of the thickness of the material to displace material to be cut with the cutting tool; and
- repeating said latter step by moving the upper platen and cutting tool away from the lower platen to the second reference point and increasing the percentage of the thickness of the material to be added to the predetermined distance until the yield strength of the material is exceeded and removing the material being cut from the remainder of the material.

* * * * *